April 9, 1929.  C. HUSS ET AL  1,708,763
METHOD AND MEANS FOR PRODUCING EMBOSSED FUR
Filed Aug. 27, 1927    2 Sheets-Sheet 1
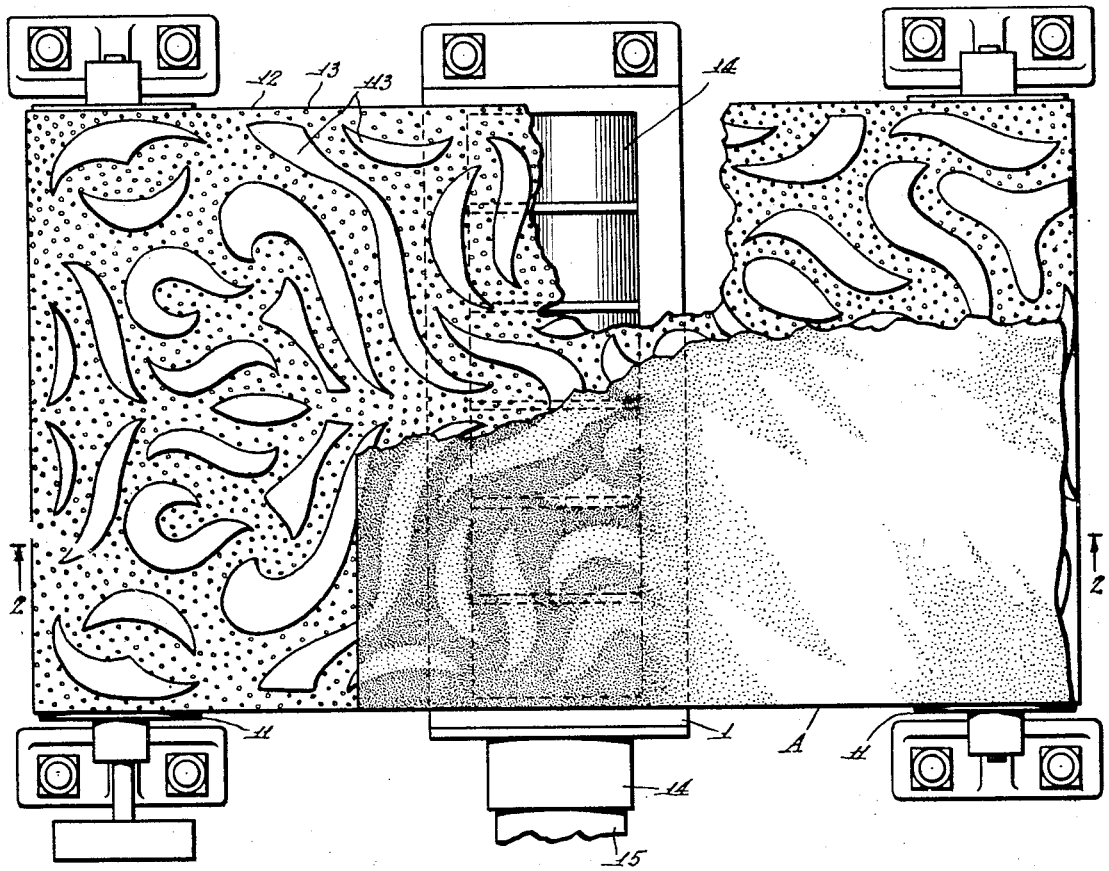
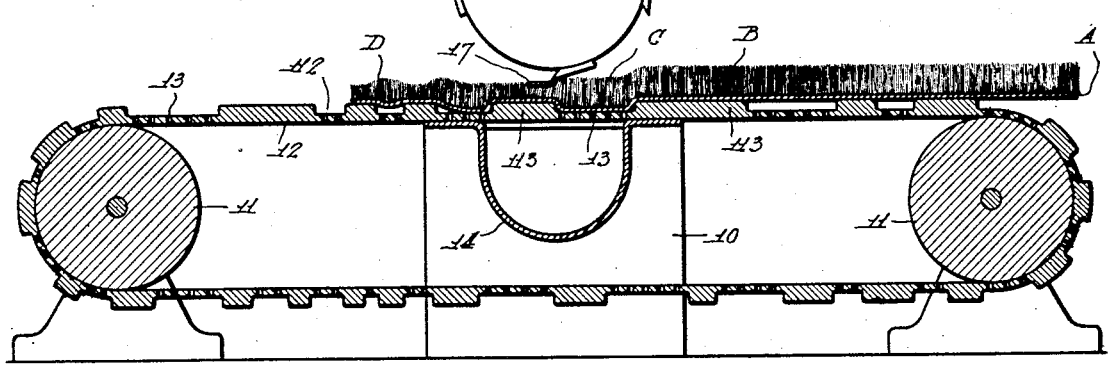
WITNESSES
INVENTOR
Carl Huss
Fritz Tournoy
BY
ATTORNEY April 9, 1929.  C. HUSS ET AL  1,708,763
METHOD AND MEANS FOR PRODUCING EMBOSSED FUR
Filed Aug. 27, 1927   2 Sheets-Sheet 2
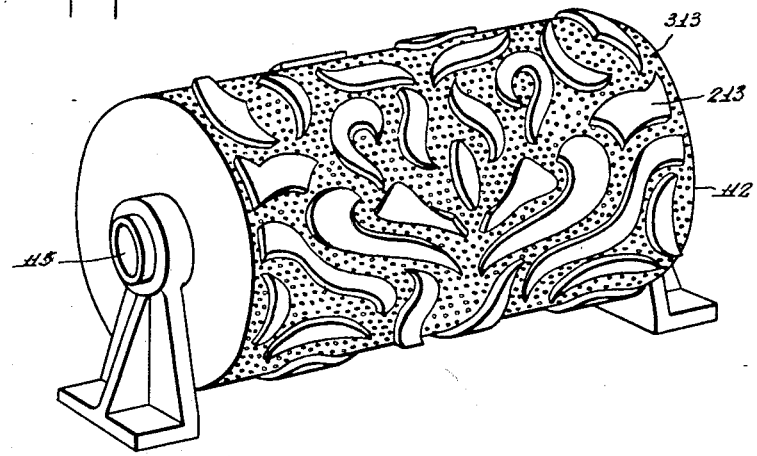
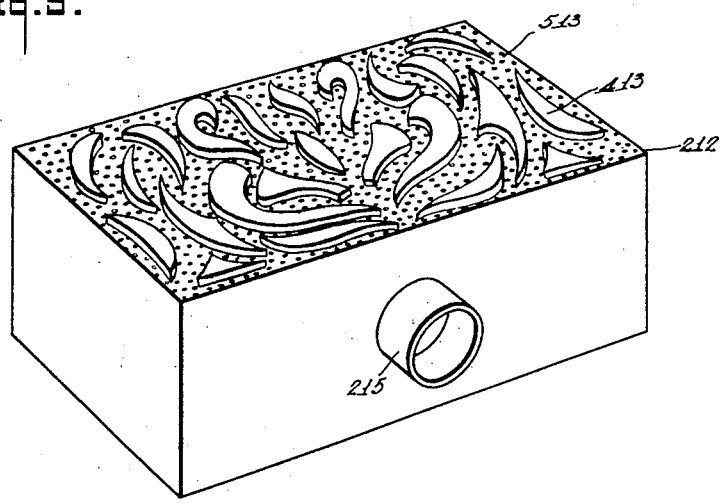
WITNESSES
INVENTOR
Carl Huss
Fritz Tournoy
BY
ATTORNEY Patented Apr. 9, 1929.

1,708,763

UNITED STATES PATENT OFFICE.

CARL HUSS AND FRITZ TOURNOY, OF NEW YORK, N. Y., ASSIGNORS TO A. HOLLANDER & SON, INC., A CORPORATION OF DELAWARE.

METHOD AND MEANS FOR PRODUCING EMBOSSED FUR.

Application filed August 27, 1927. Serial No. 215,975.

Our invention relates to furs, and particularly to the production of furs having an embossed effect. The general object of our invention is to provide a novel method and means for producing furs with an embossed effect.

The nature of our invention and its distinguishing features and advantages will clearly appear as the description proceeds.

Reference is to be had to the accompanying drawings illustrating different means for carrying out our invention, it being understood that the drawings are merely illustrative examples of means adapted for the purpose.

Figure 1 is a plan view, part being broken away, this form employing a mold in the form of an endless belt.

Figure 2 is a vertical section on the line 2—2 of Figure 1.

Figure 3 is a section of the fur after being subjected to suction and cut to present depressed areas.

Figure 4 is a perspective view of a cylindrical mold which may be employed.

Figure 5 is a perspective view of a rectangular box-like mold.

The invention includes steps of subjecting the back of the fur to suction to depress the fur over perforated areas presented by a mold having predetermined design elements raised above the perforated areas, so that those areas or portions of fur not depressed or drawn downward by suction can be effectively cut off whereby those cut-off areas will lie below the uncut areas when the fur is restored after being subjected to suction and depression.

In the drawings the letter A indicates generally a piece of fur, B the fur side, C depressed areas after the fur is cut, and D raised areas appearing after cutting.

In the form of the apparatus shown in Figures 1 and 2, suitable supporting means 10 is provided in which are revolubly mounted rollers 11 over which runs an endless mold 12 in the form of an endless belt, said mold having perforations 13 and imperforate areas 113. Beneath the working run of the belt 12, advantageously approximately central between the two rollers 11 is a suction box 14 open at the top, over which the belt 12 runs. Connected with said suction box 14 is a suction pipe 15 connected in practice with any approved suction means, not shown.

The cutting of the fur may be effected by any suitable manual or mechanical cutter means, there being shown in Figure 2 a fragment of a revoluble cutter 16 and a fixed cutter blade 17 of known form and not requiring further showing.

With the above described apparatus a piece of fur A is placed on the belt 12 and caused to travel beneath the cutter 16 and cutter blade 17. Suction being produced in the box 14, the fur A as it passes over said box will be drawn downward in those areas coming directly over the perforations 13, while the imperforate areas 113 will cause the fur to pass without being drawn down by the suction action. The result is that certain areas of the fur will project above other areas. It will be observed that the perforations 13 are in depressed portions 112 of the belt 12. With the fur disposed partly depressed and partly with the fur in its normal form, the cutter 16 will cause the fur to be cut off at the projecting areas, that is to say, the areas corresponding with the imperforate portions 113 of belt 12. The result is that when the piece of fur A restores itself to the flat form upon removal of the suction, the cut areas will be depressed as at C, Figure 3, while the uncut areas will project as indicated at D. The result is an embossed fur which will correspond with the particular design of the mold 12 because the raised areas 113 and the depressed perforated areas 13 will represent a predetermined design. Various furs may be simulated, or a conventional design produced in the fur, and obviously only the raised areas can be cut or the entire area of the fur.

In Figure 4 a cylinder 112 constitutes the mold, having various raised design elements 213 and depressed perforated areas 313. Said cylinder 112 may be employed instead of the mold 12. The numeral 115 indicates a suction pipe leading to a suction box provided within the cylinder.

Similarly, a box-like rectangular mold 212 may be employed, having raised areas or elements 413 and depressed perforated areas 513. The numeral 215 indicates a suction pipe leading to the described suction box provided within the box mold 212.

We would state furthermore that while the illustrated examples constitute practical means for carrying out our invention, we do not limit ourselves to the exact details of means herein illustrated, since, manifestly, the same can be considerably varied without departure from the spirit of the invention as defined in the appended claims.

We claim:

1. In a method of producing furs with embossed effect, subjecting the fur to suction over predetermined areas to cause the fur to be depressed at certain portions, leaving other portions normal, and cutting off the fur at said normal portions so that when the fur is restored to flat form it will vary in length at said normal portions and said depressed portions and present an embossed surface.

2. In a method of producing embossed effects on fur, depressing predetermined areas of the fur from the back of the fur, and cutting the undepressed fur.

3. In a method of producing embossed effects on fur, applying suction to the back of the fur in a manner to depress the fur at the areas at which the suction is applied, and cutting off the fur at areas other than those depressed.

4. In an apparatus for producing embossed effects on fur, a mold presenting surface depressions, said mold being perforated at the depressed areas, means for drawing said fur into said depressions from its back, and means for cutting the fur.

5. In an apparatus for producing embossed effects on fur, a mold presenting surface depressions, said mold being perforated at the depressed areas, together with suction means to draw the fur into the depressed perforated areas.

6. In an apparatus for producing embossed effects on fur, a mold presenting surface depressions, said mold being perforated at the depressed areas, together with suction means to draw the fur into the depressed perforated areas, and cutter means positioned to cut off the undepressed areas of the fur.

7. In a method of producing embossed effects on fur, depressing predetermined areas of the fur from the back of the fur, and cutting the fur to a uniform surface while so depressed.

Signed at New York, in the county of New York and State of New York, this 26th day of August, A. D. nineteen hundred and twenty-seven.

CARL HUSS.
FRITZ TOURNOY